United States Patent [19]

Roggero et al.

[11] Patent Number: 4,737,554
[45] Date of Patent: Apr. 12, 1988

[54] METHOD FOR THE TERMINATION OF LIVING POLYMERS, AND COMPOUNDS SUITABLE FOR THE PURPOSE

[76] Inventors: Arnaldo Roggero, Via Liberta 72; Mario Bruzzone, Via Cupella 4/D, both of -I- 20097 S. Donato Milanese, Milan, Italy

[21] Appl. No.: 851,483

[22] Filed: Apr. 14, 1986

Related U.S. Application Data

[62] Division of Ser. No. 602,213, Apr. 19, 1984, Pat. No. 4,618,449.

[30] Foreign Application Priority Data

May 3, 1983 [IT] Italy ................................ 20904 A/83

[51] Int. Cl.$^4$ ............................ C08F 2/42; C08F 2/38
[52] U.S. Cl. ........................................ 526/83; 526/82; 526/84; 526/85; 525/279; 525/280; 525/284; 525/289
[58] Field of Search ...................... 526/83, 82, 84, 85; 525/279, 280, 289, 284

[56] References Cited

U.S. PATENT DOCUMENTS

| | | | |
|---|---|---|---|
| 3,542,716 | 11/1970 | Muller | 526/83 |
| 3,590,008 | 6/1971 | Hansley | 525/280 |
| 3,668,279 | 6/1972 | Loveless | 526/83 |
| 3,781,281 | 12/1973 | Hartzier | 526/85 |
| 3,801,554 | 4/1974 | Selman | 526/83 |
| 3,912,697 | 10/1975 | Pacifice | 525/279 |
| 3,975,339 | 8/1976 | Burchard | 525/289 |
| 4,272,609 | 6/1981 | Klüpfel | 525/279 |
| 4,618,449 | 10/1986 | Roggero | 526/83 |

FOREIGN PATENT DOCUMENTS

| | | | |
|---|---|---|---|
| 0193252 | 9/1986 | European Pat. Off. | 526/82 |
| 54-114594 | 9/1979 | Japan | 525/279 |
| 493482 | 5/1976 | U.S.S.R. | 526/82 |

Primary Examiner—C. Warren Ivy

[57] ABSTRACT

Coupling agents of general formula

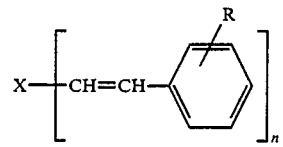

and their use in a method for the termination of living polymers obtained by anionic polymerization of diene and/or vinylaromatic monomers.

9 Claims, No Drawings

METHOD FOR THE TERMINATION OF LIVING POLYMERS, AND COMPOUNDS SUITABLE FOR THE PURPOSE

This is a divisional of application Ser. No. 602,213 filed Apr. 19, 1984, now U.S. Pat. No. 4,618,449.

If effected under suitable conditions and with suitable monomers (M. SZWARC Carbanions, Living Polymers and El. Transfer Processes, Interscience Publishers, J. Wiley & Sons, New York 1968), anionic polymerisation enables living polymers to be obtained which are well suitable for appropriate transformations. Among these, the coupling reaction (coupling of two or more polymer segments by a coupling agent to give a polymer having a molecular weight of nPM, where PM is the molecular weight of the polymer segment and n the functionality of the coupling agent) is certainly one of the most investigated, in that by a simple approach it enables important variations to be obtained, even in terms of the properties of the treated polymers. For example, in the polymerisation of dienes it is possible in this manner to increase the Mooney viscosity, decrease the cold flow, increase the green tensile strength and modify the molecular weight distribution at will.

In the synthesis of block polymers constituted by linear or branched conjunctions of elements A and B (where A is a polyvinyl and/or polyisopropanyl aromatic sequence and B is a diene sequence, which can also be hydrogenated), the use of efficient coupling agents is a factor of essential importance in that it is a known fact that the possible presence of the unreacted substances A and B in the final product depresses the technological properties thereof. Numerous examples of coupling agents are reported in the literature [H. L. HSIEH, Rubber Chem. and Techn. 49 (5), 1305 (1976)]. We have now found that polystyryl derivatives, as exemplified hereinafter, can be conveniently used as new coupling agents in that in addition to possessing the typical properties of the best coupling agents described in the literature (see H. L. Hsieh, ibid) they have the following advantages:

(i) the coupling reaction can also be effected without the use of activators
(ii) the coupling reaction can be effected at a lower temperature than that usually used for conventional coupling agents, for equal reaction times
(iii) by-products are not formed as the coupling reaction is a reaction of addition rather than elimination.

The products which we have found to be efficient coupling agents are those of the following general formula

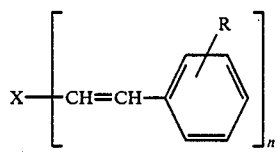

where X is an organic radical of the following structures, or a multivalent derivative thereof:

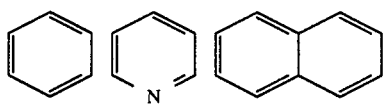

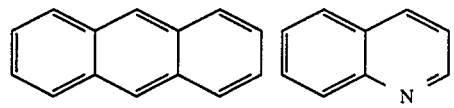

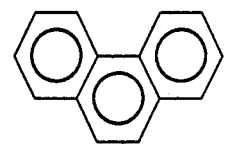

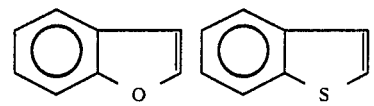

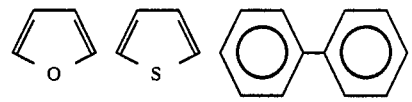

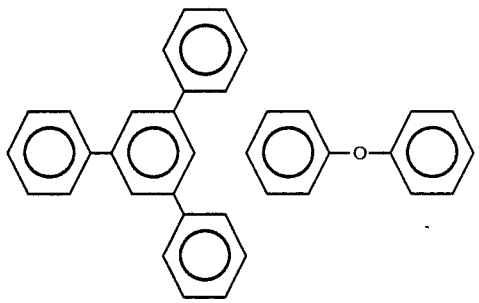

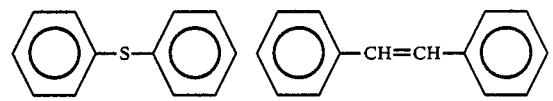

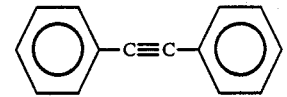

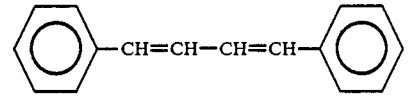

n is a whole number between 2 and 6 and preferably 2, 3 or 4; R can be hydrogen, an alkyl radical which preferably has a tertiary carbon atom directly attached to the aromatic ring, or a cycloalkyl, alkoxy, dialkylamino or aromatic radical.

R contains between 0 and 18 C atoms.

Said coupling agents are prepared in a simple manner and with high yields by the method of A. E. Siegrist and colleagues, [Helvetica Chimica Acta 52 (8), 2521 (1969), ibid 63 (5), 1311 (1980)] starting for example from the methyl derivatives of the structures exemplified heretofore by X:

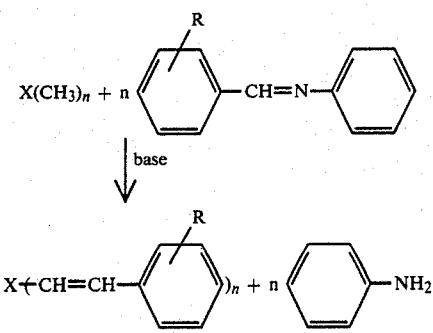

Typical non-limiting examples of methyl compounds used are: 2,6-dimethylpyridine, 2,4-dimethylpyridine, 2,4,6-trimethylpyridine, 2,3-dimethylnaphthalene, 1,5-dimethylnaphthalene, 2,3,6-trimethylnaphthalene, 1,3-dimethylbenzene, 1,3,5-trimethylbenzene, p-ditolylether, 4,4'-dimethyldiphenylethyne.

The compounds according to the present invention can be used in processes for the polymerisation of monomers susceptible to anionic initiation under living conditions, and in particular for the polymerisation of diene and/or vinylaromatic monomers.

The conjugated dienes used contain between 4 and 12 carbon atoms, and preferably between 4 and 8.

Said monomers comprise: 1,3-butadiene, isoprene, 2,3-dimethylbutadiene, piperylene, 3-butyl-1,3-octadiene and 2-phenyl-1,3-butadiene. The vinylaromatic monomers contain between 8 and 20 carbon atoms, and preferably between 8 and 14. Typical examples are: styrene, α-methylstyrene, 1-vinylnaphthalene, 2-vinylnaphthalene, 2-isopropanylnaphthalene, p-phenylstyrene, 3-methylstyrene, α-methyl-p-methylstyrene and p-cyclohexylstyrene.

The conjugated dienes and/or vinylaromatic monomers can be polymerised alone, in mixture, or sequentially to form homopolymers, statistical copolymers or block copolymers.

The polymerisation is effected in solution at a temperature of between $-100°$ and $+200°$ C. and preferably between $0°$ and $110°$ C., and at a pressure which is that of the system under the temperature conditions used, but higher or lower pressures are non contra-indicated.

Suitable solvents include paraffin, cycloparaffin and aromatic hydrocarbons. Typical examples are cyclohexanol, hexane, pentane, heptane, isooctane, benzene, toluene and mixtures thereof. Small quantities of polar compounds can be added in known manner to the solvent in order to obtain a 1,2 configuration in diene polymerisation, or in order to increase the efficiency of the initiator in the polymerisation of vinylaromatic monomers.

The initiators are the typical anionic initiators used for this purpose.

Organometal compounds of formula R-Me are preferably used, where R is an aliphatic, cycloaliphatic or aromatic hydrocarbon radical, and Me is an alkaline metal, preferably lithium.

The quantity of initiator used is relative to the molecular weight of the polymer to be obtained. The polymerisation is conducted under conditions such as to ensure the living state of the polymer obtained (M. SZWARC Carbanions, Living Polymers and El. Transfer Processes, Interscience Publishers, J. Wiley & Sons, New York 1968).

The coupling agent can be introduced into the reaction environment in any manner, either by a single addition of by partial additions, at the required time.

It is preferably introduced in the required quantity on termination of the polymerisation.

The molar quantity of coupling agent ($m_{AC}$) to be added is given by the formula $$m_{AC} = m_{CA}/f_{AC}$$

where
$m_{CA}$ is the moles of active centres in the living polymer
$f_{AC}$ is the functionality of the coupling agent.

The amount of coupling agent used influences the coupling yield. Obviously a stoichiometric ratio of the polymer active centre to the coupling agent active centre (taking its functionality into account) favours maximum yield.

The temperature at which the coupling reaction is carried out depends on the type of agent used, the type of polymer undergoing reaction, and other factors such as the reaction medium. Generally it can vary between $20°$ and $150°$ C., but is preferably between $40°$ and $80°$ C. The contact time is between some minutes and some hours, preferably being between 10 minutes and 2 hours.

Sometimes polar activators can be used to increase the coupling rate. In the case of the more active coupling compounds claimed herein, the use of these activators is not required.

The solvents are those used in polymerisation.

The coupling reaction is conducted at the natural pressure of the system at the operating temperature, but higher or lower pressures are not contra-indicated.

EXAMPLE 1

The polymerisation and coupling are carried out in a 1 liter reactor fitted with an agitator, pressure indicator, thermocouple well and a passage for introducing the reagents and inert gas.

500 cm$^3$ of anhydrous cyclohexane, 12 g of styrene and 1.0 mmoles of Li-sec.butyl are fed in that order, and are allowed to polymerise at $60°$ C. for about 1 hour. After this time, 30 g of butadiene are added and the polymerisation is completed at $60°$ C. within 1 hour. A very small quantity of this polymer is withdrawn and fed to the various analyses. 0.45 mmoles of a solution of 2,6-distyrylpyridine in benzene-cyclohexane (50—50 v/v) are then injected at $60°$ C. After 15 minutes the polymer, to which 1 g of antioxidant is added, is coagulated with an excess of methanol to obtain 42 g of product, which is dried at $60°$ C. for 15 hours under vacuum.

The properties of the polymers before and after the coupling reaction are given in Table 1.

TABLE 1

| Sample | Composition[a] % weight | | Molecular[b] weight, g/mole | | Polydispersity[c] index | Gel % | Coupling[d] efficiency % |
|---|---|---|---|---|---|---|---|
| | STY | BUT | Mw | Mn | | | |
| A-B | 30 | 70 | 55000 | 50000 | 1.1 | 0 | — |

TABLE 1-continued

| Sample | Composition[a] % weight | | Molecular[b] weight, g/mole | | Polydispersity[c] index | Gel % | Coupling[4] efficiency % |
| --- | --- | --- | --- | --- | --- | --- | --- |
| | STY | BUT | Mw | Mn | | | |
| A-B-A | 30 | 70 | 127000 | 98000 | 1.3 | 0 | >90 |

NOTES:
[a]by N.M.R.
[b]by G.P.C. measurements in accordance with the procedure described by L. H. Tung, J. Appl. Polym. Sci. 24, 953 (1979).
[c]as the ratio of Mw/Mn
[d]as the ratio of the area of the polymer peak after the coupling reaction (A-B-A) to the area of the polymer peak before the coupling reaction (A-B), these areas being determined by G.P.C.

The polymer A-B-A of Example 1 has the following technological properties:
  elongation: 915%
  ultimate tensile stress: 32 MPa
whereas the corresponding polymer A-B shows an ultimate tensile stress of about 3 MPa for equal elongation.

If the 2,6-distyrylpyridine is replaced by dichlorodiphenylsilane as the coupling agent, then under the same experimental conditions the coupling efficiency is less than 10%.

EXAMPLE 2

Example 1 is repeated, but using 2,4,6-tristyrylpyridine (0.30 mmoles), and polymers (A-B and A-B-A) are isolated having the properties given in Table 2.

TABLE 2

| Sample | Composition[a] % weight | | Molecular[b] weight, g/mole | | Polydispersity[c] index | Gel % | Coupling[4] efficiency % |
| --- | --- | --- | --- | --- | --- | --- | --- |
| | STY | BUT | Mw | Mn | | | |
| A-B | 30 | 70 | 57000 | 52000 | 1.1 | 0 | — |
| A-B-A | 30 | 70 | 196000 | 145000 | 1.35 | 0 | about 95 |

Notes: see Table 1

EXAMPLE 3

50 g of α-methylstyrene and 1 mmole of Li-sec.butyl are fed into the reactor described in Example 1, and polymerised at 20° C. for 1 hour and 15 minutes. At the end of this time, 5 g of butadiene are added and allowed to interact for 15 minutes, after which 500 cm³ of cyclohexane and 25 g of butadiene are added, allowing polymerisation to continue at 60° C. for 1 hour. A small sample is withdrawn, and 0.45 mmoles of 2,6-distyrylpyridine are then injected, the coupling reaction being conducted at a temperature of 60° C. for 15 minutes. A polymer is isolated in the usual manner (43 g) and has the properties shown in Table 3, which also gives the properties of the product A-B.

TABLE 3

| Sample | Composition[a] % weight | | Molecular[b] weight, g/mole | | Polydispersity[c] index | Gel % | Coupling[4] efficiency % |
| --- | --- | --- | --- | --- | --- | --- | --- |
| | αSTY | BUT | Mw | Mn | | | |
| A-B | 30 | 70 | 63000 | 55000 | 1.15 | 0 | — |
| A-B-A | 30 | 70 | 139000 | 99000 | 1.40 | 0 | about 90 |

Notes: see Table 1

EXAMPLE 4

Example 1 is repeated but using 2,3-distyrylnaphthalene as the coupling agent. The relative data are given in Table 4.

TABLE 4

| Sample | Composition[a] % weight | | Molecular[b] weight, g/mole | | Polydispersity[c] index | Gel % | Coupling[4] efficiency % |
| --- | --- | --- | --- | --- | --- | --- | --- |
| | STY | BUT | Mw | Mn | | | |
| A-B | 30 | 70 | 53900 | 49000 | 1.1 | 0 | — |
| A-B-A | 30 | 70 | 128000 | 95000 | 1.35 | 0 | about 85 |

Notes: see Table 1

EXAMPLE 5

The polymerisation test described in Example 3 is repeated, but using 1,3,5-tristyrylbenzene as the coupling agent. The data relative to the isolated polymers are shown in Table 5.

TABLE 5

| Sample | Composition[a] % weight | | Molecular[b] weight, g/mole | | Polydispersity[c] index | Gel % | Coupling[4] efficiency % |
| --- | --- | --- | --- | --- | --- | --- | --- |
| | αSTY | BUT | Mw | Mn | | | |
| A-B | 29 | 71 | 50600 | 46000 | 1.1 | 0 | — |
| A-B-A | 29 | 71 | 186000 | 133000 | 1.4 | 0 | >90 |

Notes: see Table 1

EXAMPLE 6

Example 1 is repeated, but polymerising isoprene instead of butadiene. 2,6-distyrylpyridine is used as the coupling agent, the reaction being conducted at 90° C. for 30 minutes.

The data relative to the isolated polymer (about 42 g) and the corresponding product A-B are given in Table 6.

TABLE 6

| Sample | Composition[a] % weight | | Molecular[b] weight, g/mole | | Polydispersity[c] index | Gel % | Coupling[4] efficiency % |
| --- | --- | --- | --- | --- | --- | --- | --- |
| | STY | BUT | Mw | Mn | | | |
| A-B | 30 | 70 | 52800 | 48000 | 1.1 | 0 | — |
| A-B-A | 30 | 70 | 124000 | 92000 | 1.35 | 0 | about 80 |

Notes: see Table 1

EXAMPLE 7

About 40 g of butadiene are polymerised with 1 mmole of Li-sec.butyl is about 400 cm³ of cyclohexane for about 1 hour at 60° C., in the apparatus heretofore described. At the end of this time, a mixture of 2,6-distyrylpyridine (0.225 mmoles) and 2,4,6-tristyrylpyridine (0.5 mmoles) is added, and the reaction allowed to proceed for 15 minutes at 60° C. The G.P.C. diagram of the isolated polymer shows the presence of peaks of products with a different degree of coupling and with a wider molecular weight distribution than that of the polymer A-B.

What is claimed is:

1. A method for the termination of living macroanions obtained by anionic polymerisation of diene and/or vinylaromatic monomers, consisting of introducing into the polymerisation mixture a coupling agent of the general formula:

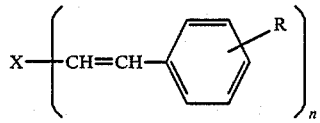

where X is an organic radical of valency n selected from the following chemical structures:

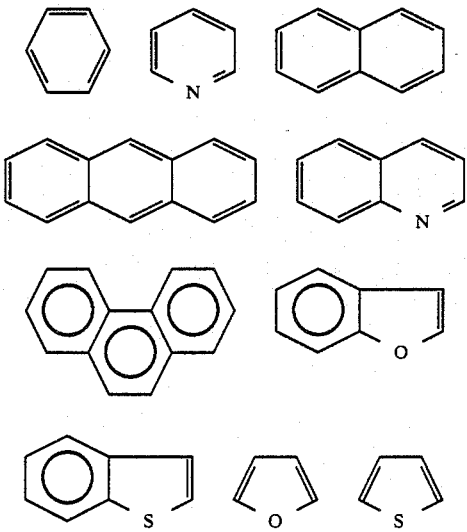

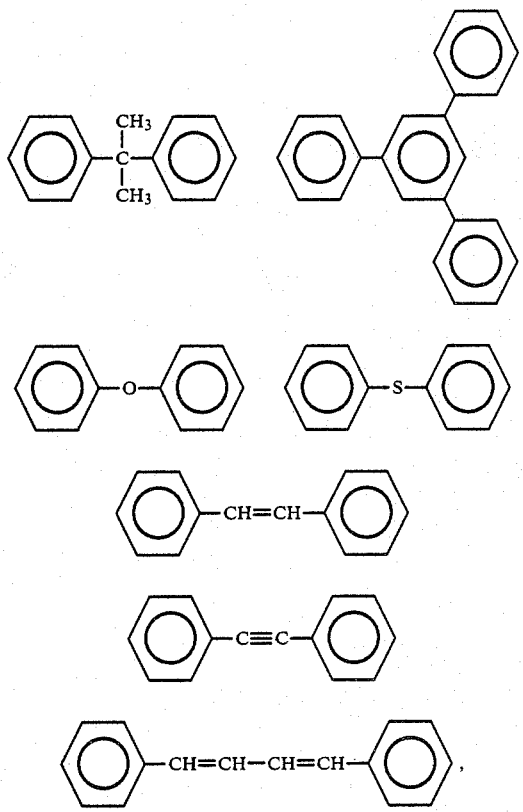

n is a whole number from 2 to 6, inclusive, and R is hydrogen or an alkyl, cycloalkyl, alkoxy, dialkylamino or aromatic radical containing 1 to 18 carbon atoms, and where the molar quantity of said coupling agent added is calculated according to the formula $m_{AC} = m_{CA}/f_{AC}$, where $m_{CA}$ is the molar quantity of active centers in the living macroanion, $f_{AC}$ is equal to n, and $m_{AC}$ is equal to the molar quantity of said coupling agent added.

2. A method as defined in claim 1, wherein the method is carried out in the absence of polar activators.

3. A method as defined in claim 1, wherein said method is carried out at a temperature of 20°–150° C.

4. A method as defined in claim 1, wherein said method is carried out at a temperature of 40°–80° C.

5. A method for the termination of living macroanions obtained by anionic polymerisation of diene and/or vinylaromatic monomers, consisting of introducing into the polymersation mixture a coupling agent of general formula

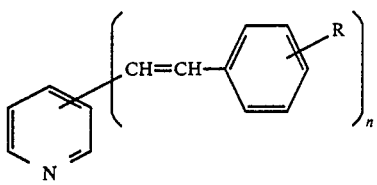

where n is a whole number from 2 to 6, inclusive, and R is hydrogen or an alkyl, cycloalkyl, alkoxy, dialkyl- amino or aromatic radical and contains from 1 to 18 carbon atoms.

6. A method a defined in claim 5, wherein n is 2, 3 or 4.

7. A method as defined in claim 6, wherein R is hydrogen.

8. A method as defined in claim 5, wherein said coupling agent is 2,6-distyrylpyridine.

9. A method as defined in claim 5, wherein said coupling agent is a mixture of 2,6-distyrylpyridine and 2,4,6-tristyrylpyridine.

* * * * *

UNITED STATES PATENT AND TRADEMARK OFFICE
CERTIFICATE OF CORRECTION

PATENT NO. : 4,737,554
DATED : April 12, 1988
INVENTOR(S) : Arnaldo Roggero et al It is certified that error appears in the above-identified patent and that said Letters Patent is hereby corrected as shown below:

On the title page Insert

--(73) Assignee: Enichem Elastomeri, S.p.A.,

Palermo, Italy --.

Signed and Sealed this

Twenty-ninth Day of August, 1989

Attest:

DONALD J. QUIGG

*Attesting Officer*    *Commissioner of Patents and Trademarks*